Jan. 27, 1970    T. V. DE PALMA ET AL    3,492,098
MULTIPLE SECTION CATALYST UNIT
Filed Dec. 1, 1965

INVENTORS:
Ted V. DePalma
Wayne J. Faust
BY:
*James R. Hootson Jr.*
*Philip J. Liggett*
ATTORNEYS

3,492,098
MULTIPLE SECTION CATALYST UNIT
Ted V. De Palma, Roselle, and Wayne J. Faust, Arlington Heights, Ill., assignors to Universal Oil Products Company, Des Plaines, Ill., a corporation of Delaware
Filed Dec. 1, 1965, Ser. No. 510,884
Int. Cl. B01j 9/04; B01d 53/34; F01n 3/16
U.S. Cl. 23—288                              9 Claims

ABSTRACT OF THE DISCLOSURE

A readily insertable and removable catalytic contact unit which is a flexible shaft to which are attached a plurality of contact elements. The unit is useful as an insert in a curved contact zone.

---

Figure 1:
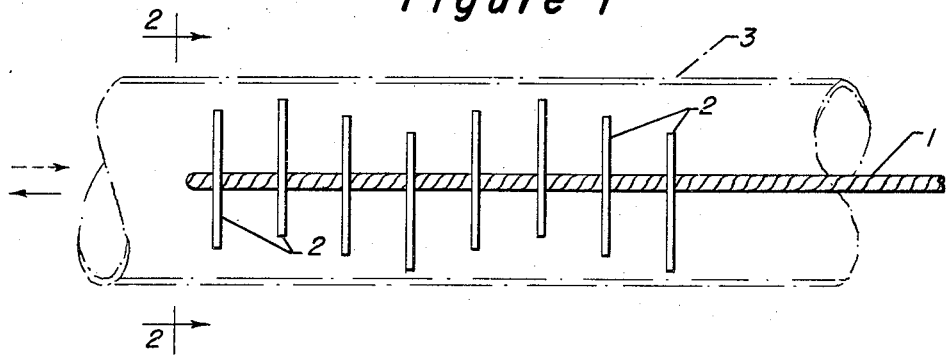

The present invention is directed to a catalytic unit adapted for placement within the path of a waste gas stream so as to effect the catalytic conversion of combustible components in such stream.

More particularly, the invention relates to providing a novel form of catalytic device which has a plurality of extended surface area members that are catalytically activated and are connected to and spaced along a central shaft member such that the whole unit may be readily inserted into an exhaust gas pipe or manifold. Various forms of catalytic coatings may be placed on the spaced members in order to provide the desired catalytic conversion of combustible components in the exhaust gas stream as it passes over and/or through the active surface of the unit. A preferred form of design will generally utilize alloy metals for the base or substrate comprising each spaced contact member, although suitable reasonably strong or rigid elements may be formed of ceramic, fire brick, fritted glass, etc. and such materials may in turn be catalytically activated by suitable impregnation means.

While the catalytic unit encompassed by the present invention is especially adapted to be used for the elimination of products of incomplete combustion from the hydrocarbonaceous exhaust gases emanating from an internal combustion engine, prior to effecting the discharge of such exhaust gases into the atmosphere, there are also other obnoxious products from processing plants which may well be treated prior to their final discharge. For example, unsaturated hydrocarbons, alcohols, ketones, aldehydes, acids, etc., as well as carbon monoxide and oxides of nitrogen and sulfur, etc., comprise objectionable materials that should be treated when being carried to the atmosphere in a waste gas stream.

The desirability and importance of effecting the removal of noxious components from automotive exhaust gases, or the conversion thereof into innocuous components, is now well recognized. At least one State, California, has passed legislation recognizing the inherent danger to the public health and welfare as such noxious gaseous material continues to be discharged into the atmosphere, and, in this regard, has appropriately instituted a Motor Vehicle Polution Control Board having as its primary purpose the elimination or conversion of these noxious components.

There are of course many forms of catalytic converters which may be utilized in connection with the treatment of engine exhaust gases, with most prior art types having a bed of catalyst particles retained within a confined gas path or contact zone by suitable internal perforate plate or screening means. Thus, there may be a through-flow, a cross-flow, or radial flow with respect to the catalyst in the converter. Generally, combustion air is injected ahead of the inlet to the converter zone by aspirator means or by suitable pumping means so that adequate oxygen is present in the converter to insure a subsequent efficient catalytic oxidation of the combustible components in the exhaust stream. In addition to catalyst particles, there have been utilized catalytically coated rigid forms of porcelain or ceramic shapes and metal elements with electrodepositions of a catalytic nature such that it is recognized there are various forms of catalyst surfaces for a converter design. However, it is not known that any of the prior designs have utilized spaced catalyst elements which in turn are connected to and spaced along a suitable shaft member such that the entire unit is readily insertable and retractable with respect to placement in a confined and elongated gas exhaust pipe or manifold zone.

It therefore may be considered a principal object of the present invention to provide a special form of catalyst unit having a plurality of high surface area contact sections spaced along a central shaft member. The amount of catalytic surface for such type of unit may of course be readily varied, by altering the number and spacing of catalyst elements along the shaft member so that there may be ease of accommodating a particular rate of hydrocarbon and carbon monoxide emission.

It is also an object of the present invention to provide a device which is of rugged construction by utilizing a plurality of spaced contact elements which use metal as a base or a substantially equivalent material that will not be readily broken and may be processed to have a large catalytic surface area through the use of a tenaciously held alumina surface which in turn may be impregnated with an active catalytic component.

In a broad aspect, the present catalytic device which is adapted for insertion within a confined elongated conversion zone receiving air and combustible components entrained within a waste gas stream, comprises, in combination, a plurality of separate enlarged surface area contact elements individually attached at spaced distances along an elongated shaft member with each of said elements sized and arranged with respect to each other and to the interior cross section of such conversion zone as to provide a turbulent gas flow along the length of the unit, and each element having a coating containing at least one active oxidizing catalyst component.

A preferred form of the device utilizes a flexible form of central shaft member such that the entire unit may be readily inserted into a discharge pipe or manifold section that is curved or other than a straight configuration. A flexible unit also permits insertion into an exhaust line through a typical Y-type fitting. In any event, it is not intended to limit the present device to having any one type or shape of spaced contact element, inasmuch as there are many variations in form that can provide the desired extended surface area and turbulent contact flow of the gas stream along a central shaft member. For example, there may be utilized a series of disc-like elements attached in a perpendicular, or normal, position with respect to the shaft member, and such disc members in turn positioned eccentrically with respect to the shaft such that there is preclusion of a straight-through flow or of any by-pass flow around the spaced disc members. Preferably, there is accomplished a turbulent contacting type of flow around and over the catalytic surfaces of each of the disc elements, without causing an excessive pressure drop in the flow path.

In another modification, there may be utilized perforate metal or screening in lieu of solid disc-like members. Also, there may be used cone or cylinder shaped members in lieu of flat disc-like elements. Still another form of unit, may comprise relatively stiff wire or ribbon formed into spirally wound discs, cones or cylinders. In any case, all shapes or configurations of contact members are provided with a tenaciously held alumina surface which in turn provides a desired porous form of extended surface area readily adapted for the impregnation of improved forms of catalyst coatings.

In actual practice, it has been found that it is quite difficult to obtain non-spalling coatings on smooth carbon steel, alloy metals, Pyrex glass, etc., so that they can withstand the high temperature conditions existing in most catalytic conversion zones and particularly where hot engine exhaust gases must be substantially converted to eliminate hydrocarbon and CO contaminants contained therein. One desirable method of coating a smooth base material, has been accomplished by applying a coating of finely divided aluminum particles suspended in a liquid vehicle which contains at least about 50% volatile materials and then subjecting the thusly coated element to oxidation at a high temperature so as to burn off the volatile materials and cause the aluminum particles to form a gamma-alumina surface directly to the base element.

Actually, in a still more preferable coating system for use with a hard glassy surface or for a smooth metal surface, it has been found that an initial ceramic coating placed over the base or substrate surface and then the whole member subjected to heat so that there is a slight softening of the glass or steel and a resulting good bond with the ceramic. The aluminum particles may then be coated over the ceramic surface and again an oxidation step utilized to effect the formation of gamma-alumina with the ceramic coating in a tenacious manner. The porous alumina surface is subsequently impregnated with a catalyst coating which may include a platinum group metal or other active oxidizing component so as to provide a highly efficient converter unit.

Reference to the accompanying drawing and the following description thereof will serve to more fully illustrate simplified forms of the present catalytic device for use in the path of an exhaust gas stream to effect a catalytic treatment thereof.

FIGURE 1 of the drawing is a diagrammatic side elevational view of one embodiment of an elongated insertable form of catalytic device using a plurality of spaced contact elements.

Figure 2:
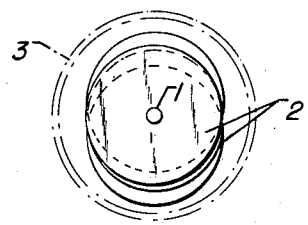

FIGURE 2 of the drawing is an end view of the device, as indicated by line 2—2 shown in FIGURE 1.

Figure 3:
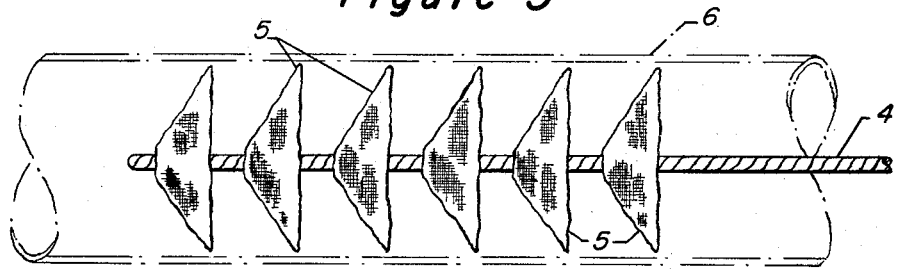

FIGURE 3 of the drawing shows diagrammatically a side view of a modified form of the insertable device which, in this instance, uses a plurality of spaced, coated elements of metal mesh.

Figure 4:
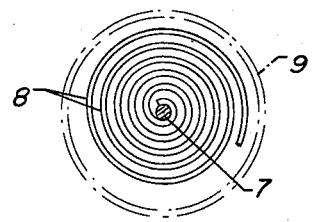

FIGURE 4 of the drawing merely indicates diagrammatically, in a cross-sectional view, a contact device which utilizes a plurality of elements formed of spirally wound metal bars or ribbon like metal.

Referring specifically to FIGURES 1 and 2, there is shown a central shaft number 1 which has a plurality of spaced disc elements 2 attached thereto. The latter are sized to be of sufficiently less diameter, or cross-sectional area, than an exhaust line or manifold duct 3 (shown in dashed lines) so that no one element will completely block the inside diameter of the line 3. Also, the disc members 2 shown being attached to the shaft 1 in a staggered manner, as for example, by having shaft holes drilled eccentrically with respect to at least a portion of the disc members, whereby there may be resulting eccentric mountings on the shaft and a prevention of straight through flow around the discs 2 when the unit is inserted into an exhaust line. Actually, the size of the contact discs 2 for insection within the pipe 3 shall be such that the open area around any one disc member shall be equal to or greater than the minimum cross-sectional area of the exhaust gas line leaving the engine or processing unit. The spacing between elements and the total number of elements which are attached to any one shaft member, to provide the complete catalyst device, shall be governed by catalytic surface area requirements as well as by insuring adequate turbulence and contacting of the entire gaseous stream passing around the contact elements and an efficient conversion of the combustible components entrained within the exhaust stream. With an active catalyst surface impregnated onto each of the discs 2 there will be an exothemic heat release for the catalytic oxidation of the combustible components in the flow stream; however, it may be noted that the present device readily permits an alteration in the spacing of discs, or in the number of elements to be used on the shaft such that there may be a ready control of the heat flux, as emanating from the catalyst device.

Although not indicated by the arrangement of FIGURE 1, it should be noted that a preferred form of device utilizes a flexible shaft member for the central shaft 1 whereby the unit can accommodate curved exhaust pipes or manifolds. Generally, each of the spaced elements 2 will be welded or otherwise fixedly attached to the shaft member 1 although, if desired, suitable clamp rings or collars can be utilized along with spacer members to hold the plurality of elements 2 in a desired elongated spaced arrangement.

As indicated briefly hereinbefore, the present improved form of device utilizes a metal base or other relatively strong and rigid form of element 2 so that they are not readily broken when the device is being inserted or retracted from a particular conversion zone. Where metal is used, the material may be of carbon steel or more generally of a high temperature resistant steel alloy, including chromium and nickel, such that there is resistance to the high temperature conditions which will exist in the zone of the catalytic device. It is of course possible to utilize rigid elements of porcelain, glass-frit, and the like in lieu of a metal substrate or in combination therewith.

In order that optimum catalytic conversion efficiencies may be obtained with the device, it is preferable that each contact element be coated with a porous inorganic support material such that there is an extended surface area that in turn may be impregnated with an active oxidizing catalyst component. Alumina provides one of the most satisfactory types of high temperature resistant inorganic catalyst support materials and it has been found that the alumina may be attached in a tenacious manner to hard smooth surfaces by suitable preparation means.

Aluminum particles may be brushed, blown, or otherwise coated onto a surface, but as a better means for effecting the distribution of the finely divided aluminum particles to the surface of the base element, it is preferred to have the particles of aluminum suspended in a liquid carrier which has a high percentage of hydrocarbons or volatile mineral spirits and driers and then coating the element with one or more coatings or layers. Upon subjecting the coated base element to high temperature in an oxidizing atmosphere there will be a substantially complete oxidation and removal of the volatile vehicle leaving the aluminum particles in a resulting gamma-alumina form providing a tenaciously held high porosity surface suitable for carrying an active catalyst component.

With a non-glassy ceramic or porcelain surface, or with glass-frit, fire brick, and the like, there may be a cleaning of the surface of the base element and a direct deposition of the aluminum particles by means of a powder, liquid vehicle, or otherwise, and then a subsequent oxidizing step in an oxidizing atmosphere suitable to remove the vehicle and to form a gamma-alumina coating to the base element. On the other hand, where smooth metallic surfaces are to be coated to provide resulting substantially rigid form catalyst units, it is preferable to provide a porcelain or "ceramic coating" to the metal as a preliminary first stage of support formation, subsequently coating the porcelain or ceramic coating with aluminum particles, then subjecting the thusly coated element to a high temperature oxidizing step in the presence of an oxidizing atmosphere at a temperature at least above about 1220° F. and sufficient to provide a slight softening of the ceramic coating on the metal whereby there is a resulting permanent adhesion of the gamma-alumina high porosity surface thereon which can be used as a catalyst carrier. The use of the ceramic coating over the metal appears to withstand subsequent temperature changes to a far better extent than methods of preparation where the aluminum oxide is formed directly on a smooth metal surface having no undercoating.

The term "alumina" as used herein shall be considered to include other metal components in admixture with alumina. For example, magnesium metal, or zinc, etc. may be coated onto the base surface along with the aluminum particles such that the resulting oxide surface may comprise a mixture of aluminum oxide and magnesium oxide or of alumina and zinc oxide, or whatever.

The term "ceramic coating" as used herein is generic and includes the various types of functional porcelain that will make "glass hard," relatively thin coatings which are not necessarily smooth and glossy. The porcelain surface is generally an alkali-alkaline earth-boro-silicate complex which can be formed by incorporating a frit or a combination of milled or ground particles of frit onto the surface of the element which will have the ceramic coating and heating such coating to a temperature sufficient to effect a bond with the metal surface. Many variations of frits and porcelain coatings may be made to provide high service temperature resistance which will vary somewhat, and may be as high as 2000° F. Such coatings will normally have some small degree of flexibility and also a coffecient of expansion which will be similar to that of metals.

With respect to the active catalyst surface to be placed over the gamma-alumina surface of each element, there may be a metal component selected from Groups V-A, VI-A and VIII of the Periodic Table.

Thus, the catalyst to be employed in the treatment of noxious, gaseous combustible waste products, prior to discharging the same into the atmosphere, may comprise the following: platinum, palladium, other noble metals such as iridium, ruthenium, and rhodium, iron, cobalt, nickel, copper, vanadium, tungsten, molybdenum, silver, gold, and various mixtures including platinum-iron, platinum-cobalt, platinum-nickel, palladium-iron, palladium-cobalt, palladium-nickel, platinum-palladium, palladium-copper-cobalt, copper-cobalt-nickel-platinum, platinum-palladium-cobalt, etc. It is understood that the catalytic activity, stability, auto-initiating temperature, and other characterisics of the catalyst of the present invention, may vary from catalyst to catalyst. Many of the specific catalytic composites discussed herein do not necessarily yield equivalent results when compared with a catalyst comprising one or more different metallic components, or when utilized under varying conditions in different applications. Generally, water soluble compounds of the particle component are used to impregnate or soak the alumina surface. Impregnation may be accomplished in a one or two hour soaking, however, longer periods may be utilized to obtain optimum results. After the impregnation the element should be subejcted to drying and heating so as to effect a stable resulting active metal oxide on the surface of each element. In still other instances it may be found of advantage for a particle conversion of an exhaust gas stream to utilize a reducing step at a high temperature as a final treatment of the impregnated element.

Referring now to FIGURE 3 of the drawing, there is shown a modified insertable form of device having a ctntral shaft member 4 and a plurality of conically shaped screen or metal mesh elements 5 that are attached to the shaft member 4 at spaced distances. The conical shape is of advantage to give an increased surface area to each element. Again, the drawing shows that the device may be inserted into a converter or an exhaust gas line, such as 6, whereby there will be catalytic conversion of combustible components carried by the discharge gas stream passing around and through the active contact surfaces of elements 5. Specifically, each metal mesh member 5 shall be suitably coated with an active tenaciously held surface, such as heretofore described in connection with elements 2, where there is an alumina coating held directly on the substrate to carry an active catalyst component, or alternatively and preferably, a suitable ceramic coating is first directly fused onto the smooth metal, a gamma-alumina coating fused to the ceramic coating and then catalyst impregnation into the alumina coating.

One of the advantages of the embodiment of FIGURE 3 resides in the use of mesh contact elements which in turn provide for a high surface area and good contact with the gaseous stream which will in turn flow through and around each of the spaced members 5 upon leaving the engine or process zone.

With particular reference to FIGURE 4, there is merely shown diagrammatically, and in a cross-sectional manner, a portion of a device which utilizes a central shaft member 7 with spaced helically formed members 8. In other words, suitable wire, ribbon, or bar stock may be formed into a plurality of helical configurations sized for placement within a particular conversion duct or manifold 9, to in turn provide sufficient surface area with respect to an exhaust gas stream passing in and around a plurality of such elements 8 that may be spaced along a central shaft 7. Each of the elements 8 may be welded or otherwise fixedly attached at spaced distances along the shaft 7, or alternatively may be held by spacers and movable collar or clamp means to such shaft along a confined longitudinal section. Still further, as described in connection with prior embodiments, there may be various types of coatings applied to the external surface area of each helical element 8 so as to provide a tenaciously held active catalyst component that will serve to accomplish the desired treatment or conversion of noxious components in the waste gas stream that will be passing around and through the catalytic device when it is inserted into an exhaust line or converter zone.

It should, of course, be realized that the present drawing is merely diagrammatical and that many additional forms of contact elements may be fabricated to provide other equivalent types of readily insertable and retractable catalyst units within the scope of the present invention. Although not shown in the drawing, it is understood that means shall be provided in connection with each unit for bringing a waste gas stream to the zone of contact with the catalyst unit, as well as means for introducing adequate air or oxygen into the presence of the gas stream and the catalyst surface, particularly where the units are to serve as catalytic oxidizing devices.

We claim as our invention:

1. A catalytic waste gas converter comprising a confined pipe-form conversion chamber including means to pass a flow of air and combustible gases therethrough, and a catalytic contact unit placed within said chamber, said unit comprising in combination an elongated flexible shaft member and a plurality of separate enlarged area contact elements having a coating of oxidizing catalyst and being individually held at adjustable spaced distances along said shaft member, said contact unit being readily insertable and retractable with respect to longitudinal placement within said confined conversion chamber.

2. The catalytic unit of claim 1 further characterized in that each of said contact elements is a disc shaped member of a rigid base material.

3. The catalytic unit of claim 1 further characterized in that each of said contact elements is disc shaped, with adjacent members so attached to said shaft that they are in staggered relationship to one another.

4. The catalytic unit of claim 1 further characterized in that each contact element is provided with a gamma-alumina coating in turn holding an impregnated catalytic coating of active oxidation component.

5. A catalytic contact unit according to claim 1 in which said contact elements are sized and arranged with respect to each other and to the interior cross section of said conversion zone so that turbulent gas flow along the length of said unit is provided.

6. The catalytic unit of claim 1 further characterized in that each of said contact elements is formed of a metal mesh whereby the gas flow can flow in part through each of said spaced elements.

7. The catalytic unit of claim 6 still further characterized in that each metal mesh contact element is of a conical configuration providing an enlarged surface area.

8. The catalytic unit of claim 1 further characterized in that each contact element is provided with an initial ceramic coating, a subsequent alumina coating which is fused to the ceramic by high temperature treatment, and a final oxidizing catalyst coating which is impregnated into the surface area of the alumina.

9. The catalytic unit of claim 8 still further characterized in that said catalyst coating incorporates a platinum group component.

References Cited

UNITED STATES PATENTS

| | | | |
|---|---|---|---|
| 2,004,865 | 6/1935 | Grison | 23—288 |
| 2,526,657 | 10/1950 | Guyer | 23—288 |
| 2,873,071 | 2/1959 | Bratton. | |
| 2,981,057 | 4/1961 | Buttler | 60—29 |
| 3,043,096 | 7/1962 | McLoughlin. | |
| 3,088,271 | 5/1963 | Smith. | |
| 3,227,659 | 1/1966 | Brandenbury et al. | |
| 2,644,800 | 7/1953 | Mottern et al. | 23—288 X |

FOREIGN PATENTS

| | | |
|---|---|---|
| 411,377 | 6/1934 | Great Britain. |
| 413,967 | 7/1934 | Great Britain. |

JOSEPH SCOVRONEK Primary Examiner

U.S. Cl. X.R.

252—477